March 28, 1967   J. W. WESTBROOK   3,311,272
POWDER MEASURING DISPENSERS
Filed Feb. 18, 1966   2 Sheets-Sheet 1
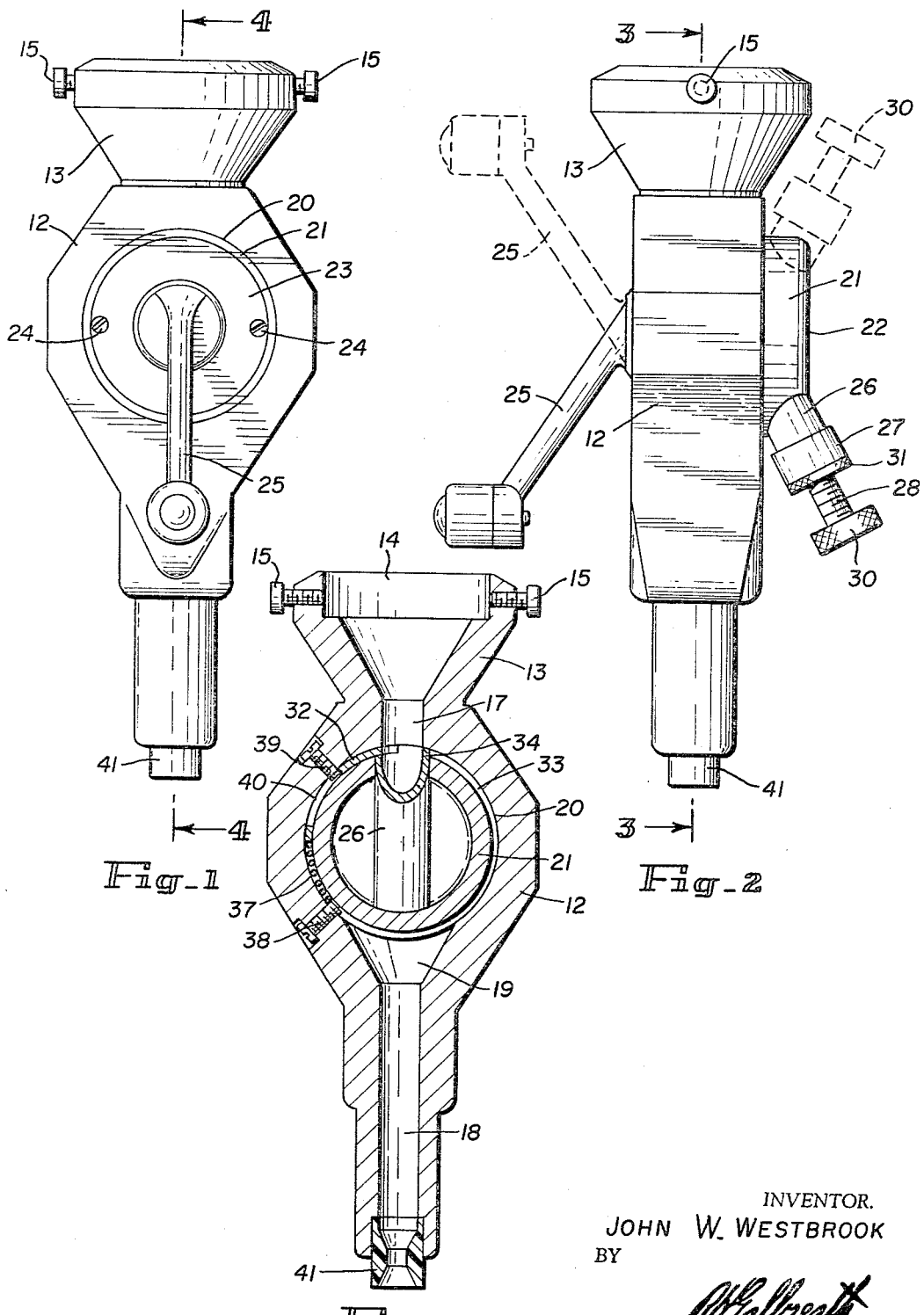
Fig_1
Fig_2
Fig_3
INVENTOR.
JOHN W. WESTBROOK
BY
ATTORNEY March 28, 1967      J. W. WESTBROOK      3,311,272
POWDER MEASURING DISPENSERS
Filed Feb. 18, 1966      2 Sheets-Sheet 2
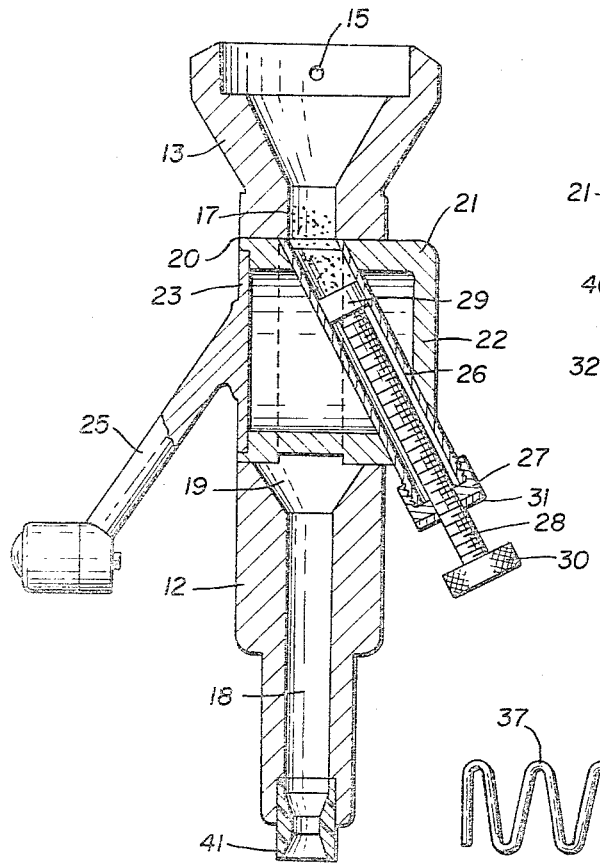
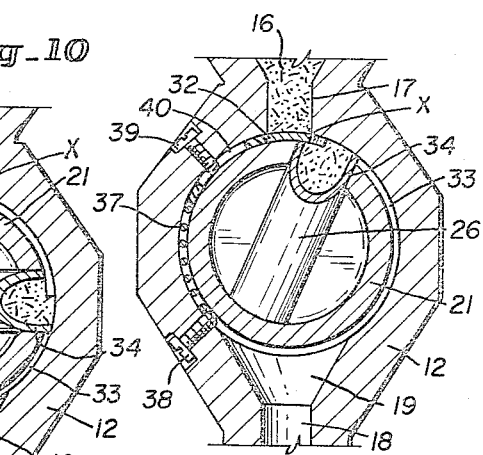
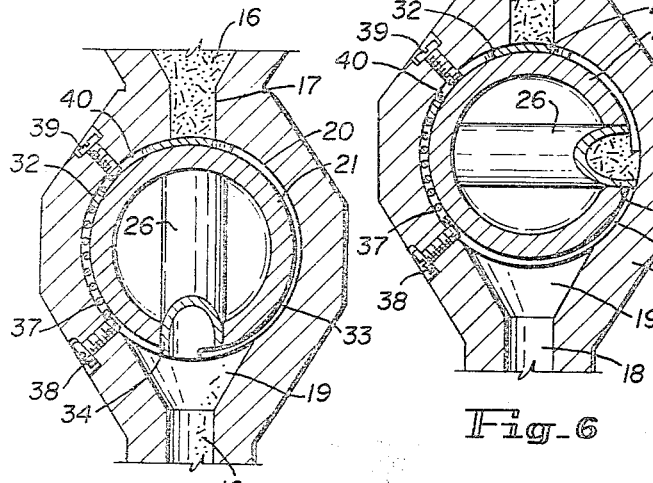
INVENTOR.
JOHN W. WESTBROOK
BY
ATTORNEY United States Patent Office 3,311,272
Patented Mar. 28, 1967

3,311,272
POWDER MEASURING DISPENSERS
John W. Westbrook, Englewood, Colo., assignor to
Trueline Instruments, Inc., Littleton, Colo.
Filed Feb. 18, 1966, Ser. No. 528,561
6 Claims. (Cl. 222—355)

This invention relates to a device for accurately measuring a powder charge and delivering the measured charge to a gun casing for reloading the latter.

Shot and powder dispensers having a rotary drum positioned within a body frame member and provided with a diametrically-extending measuring tube have been used in the art. The measuring tube aligns with a powder feed passage to receive a pre-determined quantity of powder. The drum is then rotated forwardly 180° to discharge the powder to the shell casing which is to be reloaded.

These prior dispensers have not been satisfactory due to the fact that the body frame, the drum, and the mouth of the measuring tube must fit within the casing with very close tolerance, since the drum must deliver an exceedingly accurate quantity of powder at each 180° rotation, and to the fact that powders as used for this purpose comprise elongated-grains varying in length and diameter. As a result individual powder grains will become wedged between the edges of the feed passage and the powder tube as the drum is rotated forwardly and sufficient force must then be applied to shear, break or crush the entrapped grains. This produces a powder dust which, in combination with the coating substances with which all powders are provided, adheres to and builds up on the cylindrical circumference of the drum until further rotation is difficult if not impossible. It is therefore necessary to frequently dismantle the dispensing apparatus and clean the drum and the frame member with suitable solvents to restore satisfactory operation.

Another objection to present dispensers results from the fact that the unequal and varying forces that must be applied to rotate the drum, due to the above resistances to rotation, result in varying the quantity of the delivered powder loads and prevent accurate uniformity in production.

The principal object of this invention is to provide a powder measuring dispenser of the rotating drum type: which will remove all of the above objections to the conventional type; which will eliminate crushing, breaking or cutting of entrapped powder grains; which can be operated by a relatively light, uniform application of effort; and which will deliver exceedingly accurate, uniform, pre-set loads.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a right side elevational view of the improved powder measuring dispenser as it would appear in the powder receiving position;

FIG. 2 is a rear elevational view thereof showing in solid line the charging position of the dispenser and in broken line the discharging position thereof;

FIG. 3 is a vertical medial sectional view taken on the line 3—3, FIG. 2;

FIG. 4 is a vertical medial sectional view taken on the line 4—4, FIG. 1;

FIGS. 5, 6 and 7 are fragmentary sectional views similar to FIG. 3 showing successive positions of a rotary drum assembly to be later described;

FIG. 8 is an enlarged, detail top view of the rotary drum assembly;

FIG. 9 is a similarly enlarged perspective view of a valve slide member which forms a component part of the drum assembly of FIG. 8; and FIG. 10 is a detail view showing a type of spring as employed for actuating the valve slide member of FIG. 9 in the drum assembly of FIG. 8.

The improved dispenser basically comprises the rotary drum assembly of FIG. 8 horizontally and rotatably mounted in a vertically arranged stationary housing 12.

The housing 12 terminates at its upper extremity in a hopper 13 provided with a circumferential socket 14 into which the neck of any desired powder reservoir may be inserted and secured in place by means of suitable set screws 15. The powder, indicated at 16, discharges by gravity from the hopper 13 through a feed passage 17. The lower extremity of the housing element is formed with a vertical discharge passage 18 which is axially aligned with the feed passage 17 and which is preferably enlarged at its upper extremity to form an inverted-conical powder receiving cavity 19. The lower extremity of the discharge passage is provided with a nozzle member 41 which is interchangeable to fit the mouths of the shells being reloaded.

The housing 12 is accurately and horizontally bored between the feed passage 17 and the powder receiving cavity 19 to form a cylindrical seat 20 for the rotary drum assembly of FIG. 8. The horizontal axis of the seat 20 intersects the vertical axes of the feed passage 17 and the discharge passage 18.

The rotary drum assembly comprises a cylindrical, cup-shaped drum 21 which is rotatably fitted, with very close tolerance, in the cylindrical seat 20 of the housing 12. When in position in its seat, the closed extremity of the drum, indicated at 22, projects outwardly from the left side of the housing 12 and the open extremity of the drum substantially aligns with the right side thereof as shown in FIG. 4. The open extremity is closed by means of a concentric circular crank disc 23, secured to drum by means of suitable attachment screws 24. A hand crank 25 is formed, or mounted on, the crank disc 23 by means of which the drum can be reciprocally rotated in its seat in the housing.

A powder measuring tube 26 is fixedly mounted in the drum 22 and extends, from a position on the cylindrical surface at one side of said drum, diametrically and axially outward toward the closed extremity 22 so as to angularly project from the latter at the other side of the drum as shown in FIG. 4. The powder measuring tube 26 is closed at its projecting extremity by means of a cap 27 and the opposite or circumferential extremity is axially positioned so that it will alternately register with the feed passage 17 and the discharge passage 18 as the drum is rotated back and forth. A powder measuring screw 28 is threaded through the cap 27 and terminates within the tube 26 in a measuring piston 29 which is accurately and moveably fitted in the tube 26. The screw 28 is preferably provided with a knurled finger head 30, by means of which the position of the piston 29 in the tube 26 can be accurately preset, and with a knurled jam nut 31 which will lock the screw in the desired preset position.

It can be seen that, when the drum 21 is in the upper feed position of FIGS. 2 and 3, a preset quantity of the powder 16 will flow into and fill the upper extremity of the measuring tube 26. When the drum 21 is rotated to the lower or discharge position of FIG. 7, or broken line position of FIG. 2, the measured quantity of powder will drop into the cavity 19 and flow through the discharge passage 18 and to the gun shell being reloaded.

To prevent objectionable jamming of the drum and mutilation of the powder grains, as the upper extremity of the measuring tube moves across the core of powder in the intake passage 17, an arcuate valve slide member 32, as shown in detail in FIG. 9, is slidably inset in a circumferentially extending, rectangular slide groove 33 formed about the drum 21. The width of the groove 33 substantially corresponds to the width of the upper extremity of the measuring tube 26. Approximately one-half of the latter upper extremity is cut back to the level of the bottom of the groove 33 and the remaining half of said upper extremity extends to the full diameter of the drum to provide an arcuate raised, leading edge or lip 34. The forward extremity of the valve slide member 32 extends over the cut-back half of the upper extremity of the measuring tube 26, as shown in FIG. 8, and is provided with a semi-circular notch 35 which forms a yieldable trailing edge or lip 36 on the intake extremity of the measuring tube.

The side edges of the forward extremity of the valve slide member 32 are constantly and resiliently urged into contact with the side edges of the raised leading edge 34 by means of a flat, zig-zag, compression spring 37 which is positioned in the slide groove 33 of the drum and which is compressed between the rear extremity of the valve slide member and a spring stop screw 38. The stop screw 38 is threaded through the wall of the housing 12 and enters the slide groove 33 so as to be contacted by the spring. Rotational movement of the valve slide member is limited to a distance substantially equal to the diameter of the feed passage 17 by means of a limiting screw 39 which is also threaded through the housing wall and enters an elongated movement-limiting slot 40 in the valve slide member.

Let us assume: that a quantity of powder has filled the upper extremity of the measuring tube 26, as shown in FIG. 1; that the drum 21 is rotated toward the discharge position, as shown in FIG. 5; and that a grain of powder has become pinched or wedged between the trailing edge 36 and the far wall of the feed passage 17, as indicated at X in FIG. 5. This would normally prevent further rotation of the drum until the grain or grains of powder were crushed.

However, in this invention the slide member moves forward under spring pressure so that the rotation of the drum may continue while the valve slide member is maintained stationary against the stuck grains X under the bias of the spring 37, as shown in FIG. 6. The rotation continues uninterruptedly until the discharge point of FIG. 7 is reached when the powder will fall from the measuring tube into the cavity 19 and flow into the discharge passage 18. Further rotation is prevented by the raised leading edge 34 of the measuring tube 26 contacting the spring stop screw 38.

The rotation is now reversed until the leading edge 34 contacts the valve slide member 32, as shown in FIG. 8, to rotate the measuring tube 26 rearwardly into register with the wall of the feed passage 17 at which point the reverse rotation will be stopped due to contact between the upper extremity of the limiting slot 40 with the limiting screw 39.

Thus, the slide member 32 will be withdrawn from the "stuck" grains and they will fall freely into the measuring tube with the incoming powder. The limiting screw 39 also serves to prevent axial movement of the drum 21 in the housing 12 since the drum cannot move laterally with reference to the valve slide member 32 and the latter cannot move laterally with reference to the limiting screw 39. Both screws 38 and 39 must be partially removed to remove or replace the drum 21. The device 21 may be supported in a vertical position by any means conventional with powder measuring devices such as by a suitable clamp (not shown) about the lower extremity of the housing 12.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A powder measuring dispenser, of the type having a housing, a vertical powder feed passage in said housing, a powder discharge passage below said feed passage, a cylindrical, cup-shaped drum rotatably mounted in said housing intermediate said feed and discharge passages, a measuring tube fixedly and diametrically mounted in said drum so positioned as to present an open extremity which can be alternately aligned with said feed passage and with said discharge passage in consequence of reciprocal rotation of said drum, having:
   (a) a slide groove of rectangular cross-section circumferentially surrounding said drum in the plane of said open extremity;
   (b) an arcuate slide member corresponding in radius and cross-section to said slide groove slidably and circumferentially inset therein with its forward extremity forming a trailing edge on said open extremity;
   (c) resilient means resiliently urging said slide member forwardly in said slide groove to resiliently close said powder feed passage so that should further forward movement of said slide member be obstructed at said feed passage said drum may continue to rotate forwardly; and
   (d) means projecting from said drum positioned to contact and move said slide member rearwardly against the bias of said resilient means to open said feed passage when said drum is rotated rearwardly.

2. A powder measuring dispenser as described in claim 1 having:
   (a) a circumferentially elongated slot formed in said arcuate slide member; and
   (b) a stop element mounted in said housing and extending into said elongated slot for limiting the forward and rearward movements of said slide member to the length of said slot.

3. A powder measuring dispenser as described in claim 2 in which the resilient means comprises:
   (a) a spring abutment mounted in said housing and extending into said slide groove rearwardly of said arcuate slide member; and
   (b) an expansive spring positioned in said slide groove and compressed between said abutment and the rear extremity of said arcuate slide member and resiliently urging the latter forwardly.

4. A powder measuring dispenser as described in claim 3 in which the means projecting from said drum comprises:
   (a) a raised semi-circular measuring tube projecting radially outward from said drum and into said slide groove to the full diameter of said drum and forming a fixed semi-circular lip extending partially about and forming a leading edge on the open extremity of said measuring tube against which said arcuate slide member is urged by said spring.

5. A powder measuring dispenser as described in claim 4 having:
 (a) a semi-circular notch formed in the forward extremity of said arcuate slide member having a radius substantially equal to the said semi-circular lip extending about the remainder of the open extremity of said measuring tube.

6. A powder measuring dispenser as described in claim 5 in which the outside radius of the arcuate slide member corresponds to the outside radius of the drum and in which the cross-section of the arcuate slide member corresponds to the cross-section of the slide groove in said drum.

References Cited by the Examiner

UNITED STATES PATENTS

| | | | |
|---|---|---|---|
| 2,550,827 | 5/1951 | Lachmiller | 222—308 |
| 3,204,833 | 9/1965 | Weitzner | 222—355 |

ROBERT B. REEVES, *Primary Examiner.*

M. HENSON WOOD, JR., *Examiner.*

N. L. STACK, *Assistant Examiner.*